INVENTORS
GUY H. TUCKER
JOSEPH H. MAHAFFEY, JR.
BY
Patrick J. Henry
ATTORNEY

OPTICAL READING SYSTEM

Filed Nov. 4, 1964 Sheet 2 of 4

INVENTORS
GUY H. TUCKER
JOSEPH H. MAHAFFEY, JR.
BY
Patrick F. Henry
ATTORNEY

INVENTORS
GUY H. TUCKER
JOSEPH H. MAHAFFEY, JR.
BY
Patrick & Henry
ATTORNEY

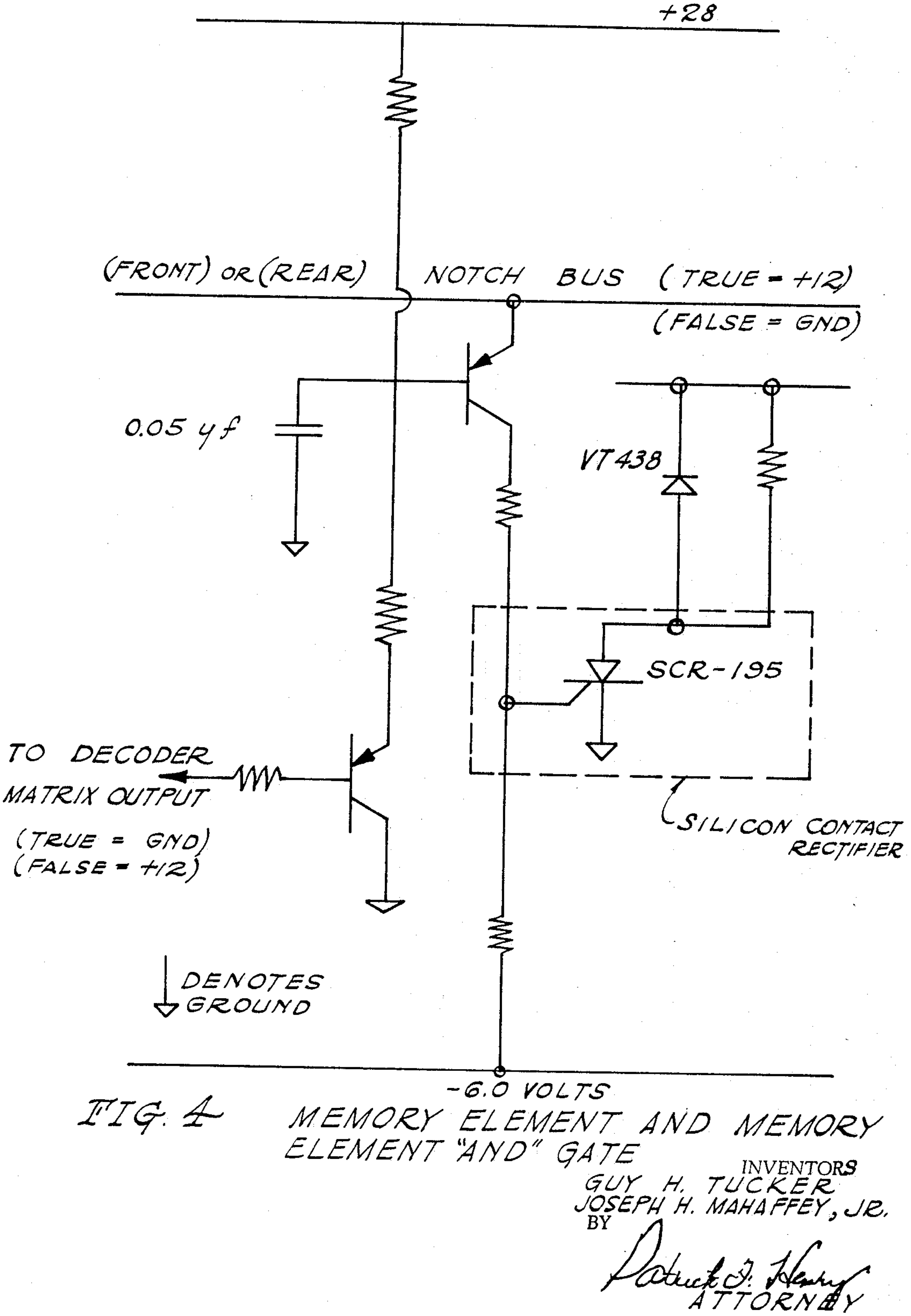
FIG. 4 MEMORY ELEMENT AND MEMORY ELEMENT "AND" GATE
INVENTORS
GUY H. TUCKER
JOSEPH H. MAHAFFEY, JR.
BY
Patrick J. Henry
ATTORNEY United States Patent Office 3,443,068

Patented May 6, 1969

3,443,068

OPTICAL READING SYSTEM

Guy H. Tucker, 1961 Harts Mill Road, Chamblee Ga. 30005, and Joseph H. Mahaffey, Jr., 6835 Sunnybrook Lane, Atlanta, Ga. 30328

Filed Nov. 4, 1964, Ser. No. 408,902
Int. Cl. G06k *7/14;* G01n *21/30*
U.S. Cl. 235—61.11 5 Claims

ABSTRACT OF THE DISCLOSURE

An optical reading system employing light sensors electronically related with a decoding and memory addressing arrangement so that the detection of light through a particular element, such as an addressing plate, stencil or tab card having notches, may be read and stored and retrieved.

One particular example of the use of the present invention is with relation to the large quantities of addressing plates which are metal plates that have notches or holes cut into the sides or on other locations and which are normally used in an addressing machine for printing the address on papers and the like. Large quantities of these plates are stored and the position of the notches, which in some cases are twenty four (24) on each side if a rectangular plate, determines certain information as to that particular plate such as the geographical location of the person whose name is on that plate, or that person's age, income group or any other information. It is often desirable to separate these plates into groups according to some basic information, such as age, occupation, income and so forth, in order, for example, to address a particular type of mail only to persons having that identity. For example, it might be desirable in one particular mailing to sort out all of the plates of the people living only in Georgia from a large group of plates having people who live in all fifty states. Normally this would require a great deal of sorting. The present optical reading system may be used for sorting these plates so as to tabulate and retrieve the information.

Generally described, without restriction on the scope of our invention which is set forth in the appended claims, the present invention includes a device for holding a plate or the like connected by some means such as mechanical and/or electrical linkage to the optical commutator which is located with respect to light source devices in one position and light sensor devices in the other position. A light source device is located with respect to the addressing plate and a light sensor device is located also with respect to that light source. The optical commutator, sometimes called an opticom, is moveable with the addressing plate and both move with respect to their respective light sources and light sensors. Electrical circuits electronically relate the light sources and the opticom plate in a relationship. The light sensors and opticom are energized by light passing through the openings in the opticom plate. Since there are twenty-four (24) notches on each side of a typical plate, the output from the sensors are energized if the notches under the light source and the light will impinge on the light sensor and if no notch is under the light source then the plate cuts off the light to the light sensor. Light sensor amplifiers amplify the output to a useable level. If a notch in the plate allows light to strike one of the sensors, then the sensor will energize the light sensor amplifier in the corresponding relationship in the opticom plate will determine the information fed into a typical binary, such as a Burrough's into a lined decimal decoder module.

*Objects and advantages*

A primary object of this invention is to read items such as addressing plates having many openings therein, each of which represents an information bit and there being one or more rows of same, by optical scanning with a lesser number of scanners than there are openings and then reading or storing the information by means of other sensing devices.

Another object resides in the use of optical scanning devices or sensors quickly to scan the openings in an item as it is moved relative thereto, or vice versa, and then to translate that by means of another scanning or sensing device moved therewith.

An advantage of the present arrangement includes the use of a silicon controlled rectifier used as a memory storage element.

A primary object of this invention is to gather information, store and retrieve same by optically reading the openings in a basic device such as an addressing plate.

Another object of this invention is the optical scanning of the device by one set of light source and light sensors electronically related to an optical commutator which properly tabulates the information electronically.

Other and further objects and advantages of our invention will be apparent upon reading the following specification taken in conjunction with the accompanying drawings, in which:

FIG. 4 is a circuit diagram of a memory element and memory element and "gate" which may be used in the present invention.

Figure 1:
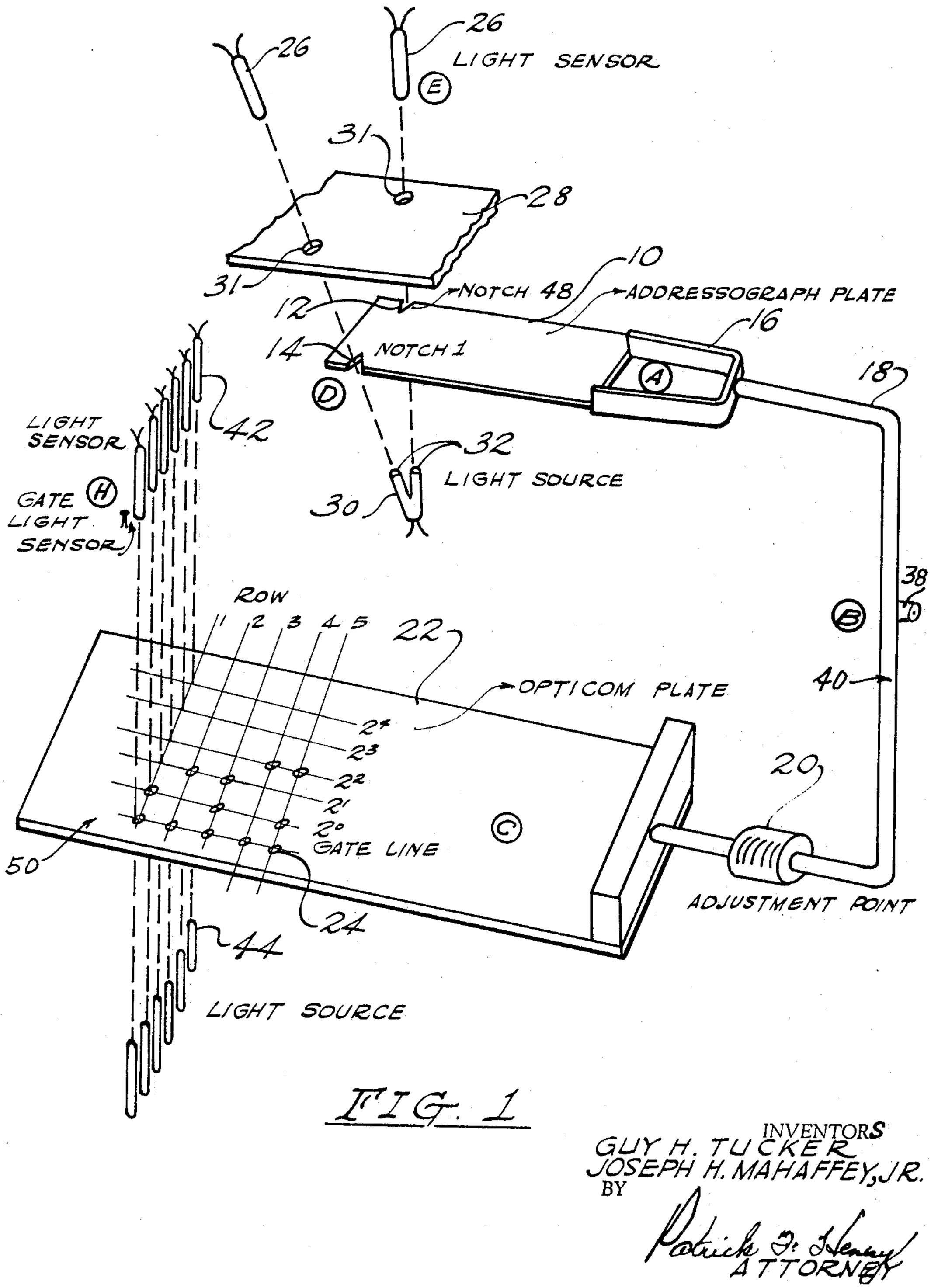
FIG 1 is a schematic diagram of the mechanical portion of the present invention in conjunction with some of the electronic elements.

The present invention, has a typical addressing plate 10 which may be one used with Addressograph-Multigraph Speedaumat, has has provision for 48 notches, 24 on one side and 24 on the other, for a total of 48 notches. Each notch represents a separate number starting with14 (1) on one side and corresponding 12 (48) on the other. Plate 10 is supported on a holder 16 mounted on a support device 18 adjustably connected by means of a connection 20 to an optical commutator plate 22 on which is located a series of carefully spaced and aligned holes 24 arranged in rows one through five in one direction and six rows in the other direction starting with a gate line row on one side and thence to a $2^0$, $2^1$, $2^2$, $2^3$, $2^4$.

Light sensors 26 are positioned and mounted in a certain relationship to read through a light sensing plate 28 above the addressing plate 10. These light sensors are common electronic elements such as Texas Instrument L.S. Photo Devices. A directed light source 30 with two directed lights 32 are aimed at the respective opposite sides 12, 14 of the addressing plate 10 and through openings 31 in plate 28 to respective light sensors which are optical sensing devices 26 thereby reading light will pass through any notches 12, 14 that are present and which conversely will not read when the light source from lights 32 are blocked out by the absence of a notch 12, 14. A suitable motion producing means 38 is provided to move the entire device which is designated as an assembly as 40 carrying the addressing plate and the optical commutator simultaneously together.

Arranged above the optical commutator plate 22 which is sometimes referred to herein as opticom, is a plurality of light sensors 42 of the same type as sensors 26, there being six corresponding to the six rows from the gate line through the two to the fourth power row of the opticom plate 22. Below the opticom plate 22 there are located six light sources 44 which are of the same type as the light sources 32 and located, aimed and aligned to pass through the openings at the positions at the intersections of lines drawn along rows one through twenty-seven (five of which are illustrated) and the corresponding intersections with the lines drawn through the gate lines and through the two to the fourth power row, there being one hundred and sixty-two such positions having ninety-one openings 24 therein. Thus, as the opticom plate 22 is moved horizontally between the light sources 44 and the corresponding light sensors 42, the beam of light will pass successively through the appropriate holes in each of the twenty-seven rows and this occurs simultaneously with the movement of the addressing plate 10 through the light path between the light sources 32 and the light sensors 26. This simultaneous operation, electronically connected as prescribed hereinafter is used to provide the reading of forty-eight notches on plates and the subsequent entry of this information into a storage memory device which can be retrieved.

The system is adjusted such that the position of notch 14 (1) in the addressing machine plate 10 is aligned with a light sensor 26 in the reading head thereabove. The opticom plate 22 is adjusted such that the binary number "1" is produced by the light sensors 42. In the present example shown in FIG. 1, only two of the light sensors 42 are seeing light through the two to the zero power bit readout sensor and the gate sensor. The same relationship automatically exists for notch 2 in the addressing machine plate 10 and the binary number 2 in the opticom plate 22 since the spacing of the notches and the holes are equal.

Figure 2:
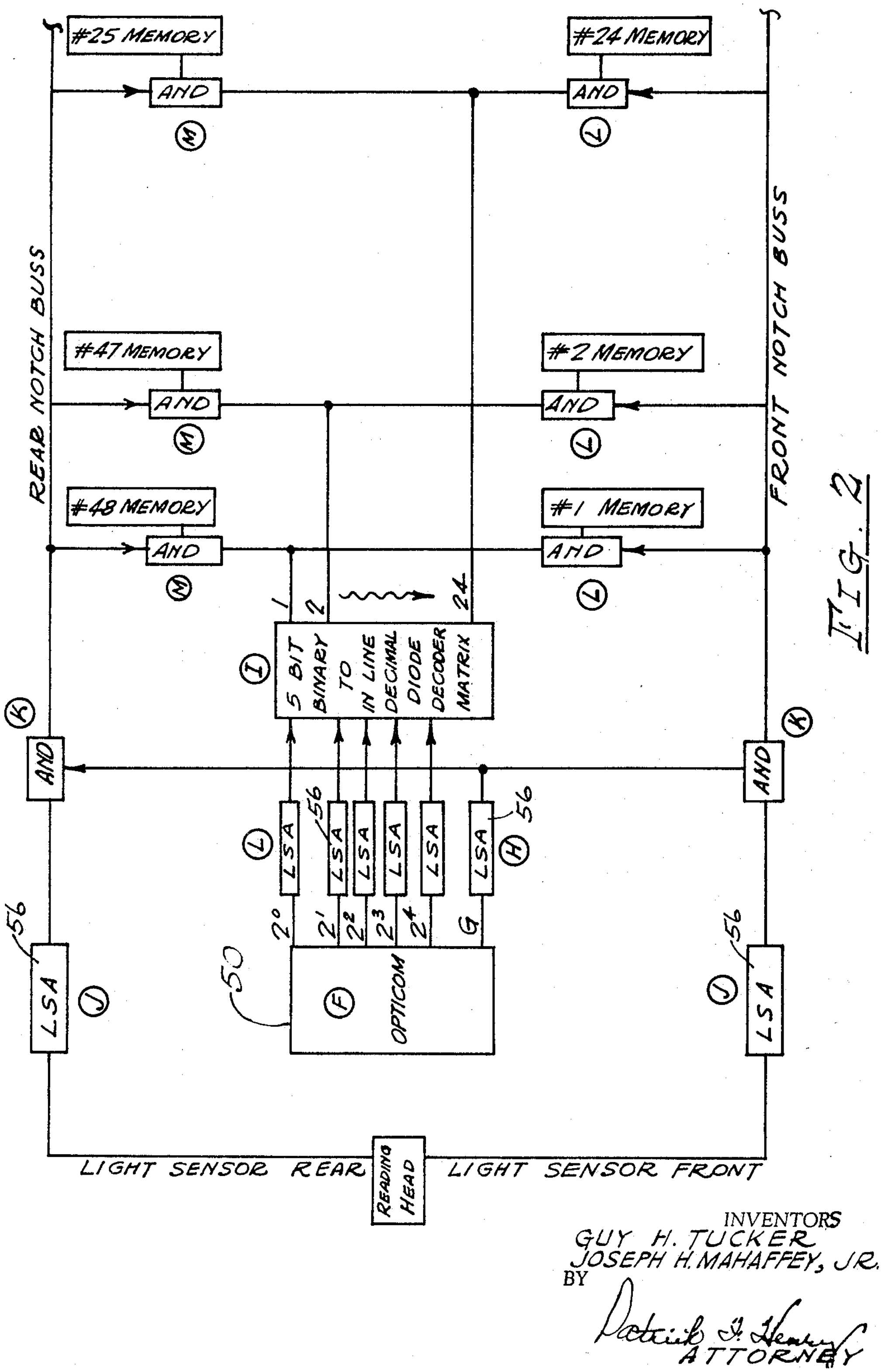
FIG. 2 is a logic diagram for the optical reading system of the present invention.

In FIG. 2, there is shown a complete diagram of the reading system which would read an Addressograph-Multigraph Seedaumat plate having twenty-four notches cut into one edge of the plate and twenty-four notches cut into the opposite side of the plate for a total of forty-eight notches. In the present arrangement, opticom positions one through twenty-four are used to designate notches one through twenty-four on one side of the plate and notches forty-eight through twenty-five on the rear edge of the plate, notch forty-eight is opposite notch one.

Figure 3:
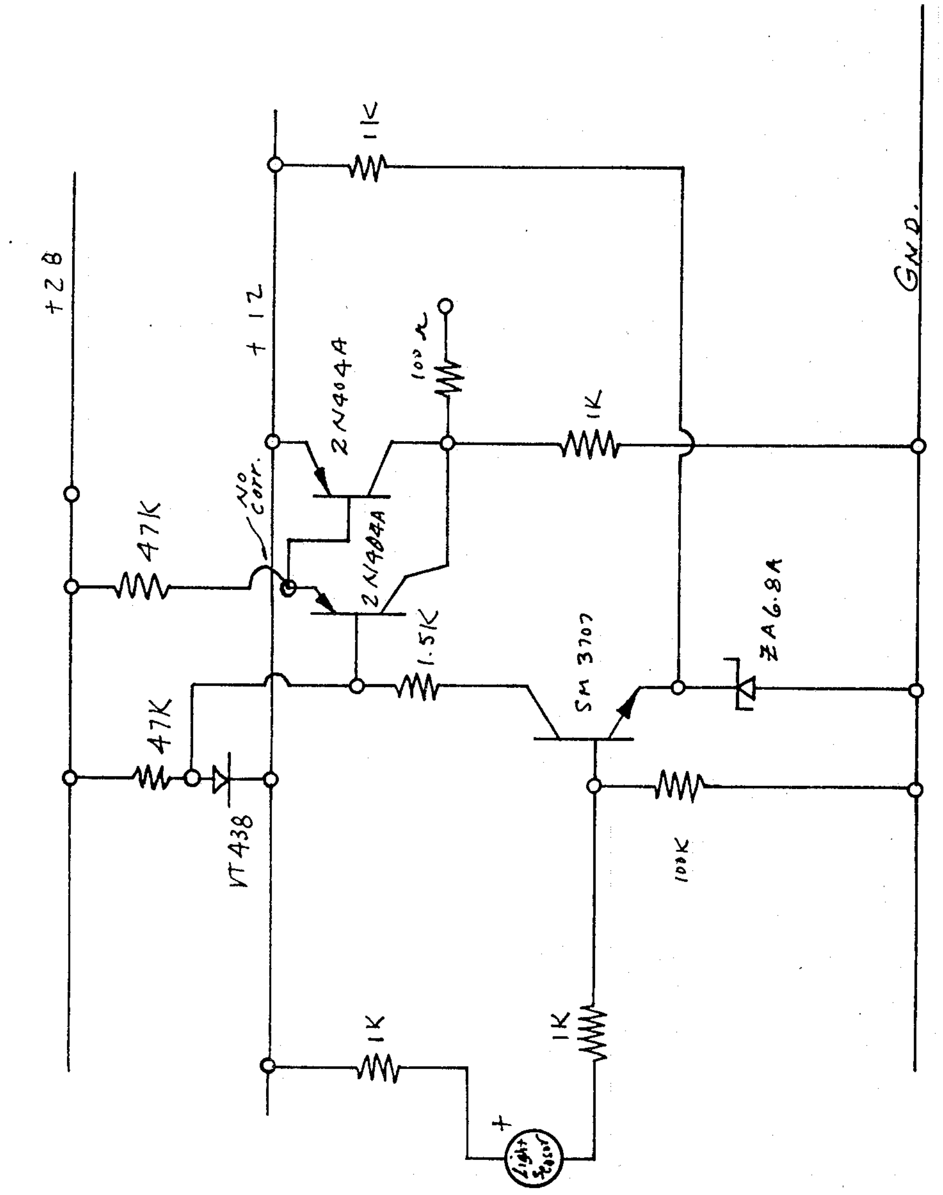
FIG. 3 is a circuit diagram of a typical light sensor amplifier which may be used in conjunction with the present device.

In FIG. 4, there is shown a typical light sensor amplifier (LSA) and in FIG. 3 there is shown a typical light sensor amplifier (LSA) schematic diagram. The amplifier circuit shown in FIG. 3 is provided to amplify microampere output of the light sensors 28, 42 up to the milliampere level required by the decimal decoder matrix, and the various "and" gates.

In the operation of the decoding and memory portion of the system, in FIG. 2 the light sensors 42 in the opticom 50 are energized by light passing from light sources 44 through the holes 24 in the plate 22. The output line from the opticom 50 are energized and any of the sensors 42 which have light striking them turn on the associated light sensor amplifier sensors. The outputs of the opticom light sensor amplifiers are fed to the Burrough's five bit binary to in line decimal decoder module. A total of thirty-two output lines are provided by the decoder module. Of these, twenty-four used as address lines for the forty-eight memory bits. Several others are used to check for proper operation of the reading head sensors 26 and the opticom 50 as the plate 10 is read. The output from the front and rear light sensors 26 in the head which comprises the light sensors 26 are energized from plate 10 with a notch cut into it is caused to move under the head having light sensors 26. The mechanical arrangements 40 moved by mechanism 38 is such that if a notch is cut out of the plate 10 in a particular location, then when the notch at that location is under the light source 32 then the particular light source 32 will impinge on the light sensor 26. If no notch is under the light sensor 26, then light is cut off by the plate 10. The light sensor amplifiers 56, associated with the sensors 26, amplify the output of the light sensors in the head with sensors 26, to a usable level. If a notch in the plate 10, allows light to strike one of the sensors 26 in the head, then the sensor 26 will energize the corresponding light sensor amplifier 56. If at the same time, the "gate" light sensor in the opticom 50 is energized by the gate light source, then the associated light sensor amplifiers 56 provide an output to the "and" gate. This causes an output to the "Front Notch Buss" or the "Rear Notch Buss" as the case may be. Mechanical aspects of the opticom provide that all the digit outputs ($2^0$, $2^1$, $2^2$, $2^3$, $2^4$) are energized or are not energized *before* the gate output of the opticom 50 is energized. Thus, before the "gate" 60 output is provided to the Notch Buss, one of the front memory steering "and" gates in the front half 62 and one of the memory element "and" gates in the rear half 64 already have one input energized by the diode matrix 66, then one of the memory element "and" gates provide an output. This output sets the memory element corresponding to the notch cut into the plate. The memory element used in the present system is an eight ampere SCR (Motorola type SCR-195). These SCR's used as memory elements provide the capability of driving many relays directly without the use of further amplifiers. A schematic diagram of the memory element "and" gate, and the memory element is shown in FIG. 4.

While we have shown and described a particular system, apparatus and method for optically reading and remembering information and allowing the retrieval of same, this is by way of illustration only and does not constitute sort of limitation on the scope of our invention since various alterations, changes, deviations, ramifications and variations may be made in the embodiment shown and described without departing from the scope of our invention as defined in the appended claims.

We claim:

1. An optical device for reading serially any item having pre-determined open positions located thereon such as an address plate, stencil or tab card, comprising:

(a) a holder for said item, (b) a light source on one side of said item focused on a position on said device, (c) at least one light sensor located on the other side of said device and focused and aimed to receive light directed from said light source through any open positions on said item, (d) a commutator plate having means thereon for sensing the plate position, said means including a plurality of plate positions and each of said plate positions being related to said sensor in (c) and being movable simultaneously with said item a predetermined distance with respect thereto, sensing means arranged to read said commutator plate position and to sense that position with respect to said sensor in (c), (e) means actuated by said sensing means, converting said sensing to an electrical signal, (f) means for converting said electrical signals from the means (e) to other electrical signals suitable for a data storage means, (g) and means for moving said commutator plate and said holder.

2. The device in claim 1, wherein said sensing means is a light source and a light sensor and wherein said means actuated by said sensing means is the electrical signal producing portion of the light sensor and electrical circuit for amplifying the signal.

3. The device in claim 4, including other electrical signals suitable for entrance into a data storage means.

4. The device in claim 4 wherein said first reading head includes at least one light source and a light sensor focused therewith, and wherein said second sensing means includes a light source and light sensors focused through selectively positioned openings with respect to a gate line and other digits.

5. The device in claim 4 wherein said openings on said second sensing means are on a plate having gate line openings in one direction and digit opening in the other direction and wherein said plate is moved simultaneously with said item.

References Cited

UNITED STATES PATENTS 2,820,907 1/1958 Silverman.

MAYNARD R. WILBUR, *Primary Examiner.*

T. J. SLOYAN, *Assistant Examiner.*

U.S. Cl. X.R.

250—219